US007226328B1

(12) United States Patent
Puzella et al.

(10) Patent No.: US 7,226,328 B1
(45) Date of Patent: Jun. 5, 2007

(54) EXTENDABLE SPAR BUOY SEA-BASED COMMUNICATION SYSTEM

(75) Inventors: Angelo M. Puzella, Marlboro, MA (US); Thomas C. Smith, Wakefield, RI (US); Yueh-Chi Chang, Northboro, MA (US); Brian D. Lamont, Westborough, MA (US); Mario D'Amico, Watertown, MA (US); Leon Wardle, Wayland, MA (US)

(73) Assignee: Raytheon Company, Waltham, WA (US)

( * ) Notice: Subject to any disclaimer, the term of this patent is extended or adjusted under 35 U.S.C. 154(b) by 191 days.

(21) Appl. No.: 11/059,264

(22) Filed: Feb. 16, 2005

(51) Int. Cl.
*B63B 22/00* (2006.01)
*H04B 1/59* (2006.01)

(52) U.S. Cl. .......................................... 441/11; 367/4

(58) Field of Classification Search .................... 441/6, 441/11; 114/312, 313, 326, 328; 367/4, 367/141
See application file for complete search history.

(56) References Cited

U.S. PATENT DOCUMENTS

| | | | | |
|---|---|---|---|---|
| 3,258,595 | A | 6/1966 | Galante | |
| 4,794,575 | A | 12/1988 | Miller | |
| 5,018,852 | A | 5/1991 | Cheng et al. | |
| 5,060,206 | A | 10/1991 | DeMetz, Sr. | |
| 5,319,376 | A * | 6/1994 | Eninger | 342/357.09 |
| 5,543,972 | A | 8/1996 | Kamewada | |
| 5,579,285 | A | 11/1996 | Hubert | |
| 5,661,294 | A | 8/1997 | Buchmann et al. | |
| 5,690,041 | A | 11/1997 | Hillenbrand et al. | |
| 5,973,733 | A | 10/1999 | Gove | |
| 6,164,179 | A | 12/2000 | Buffman | |
| 6,525,762 | B1 | 2/2003 | Mileski et al. | |
| 6,611,662 | B1 | 8/2003 | Grober | |
| 6,639,567 | B2 | 10/2003 | Chang et al. | |
| 6,711,095 | B1 | 3/2004 | Daniels | |
| 2002/0006000 | A1 | 1/2002 | Kumata et al. | |
| 2003/0007795 | A1 | 1/2003 | Grober | |
| 2003/0020829 | A1 | 1/2003 | Croasdale et al. | |
| 2005/0013961 | A1 | 1/2005 | Fossey, Jr. et al. | |
| 2005/0014430 | A1 | 1/2005 | Fredberg et al. | |

FOREIGN PATENT DOCUMENTS

| | | |
|---|---|---|
| JP | 01299482 | 12/1989 |
| JP | 02141717 | 5/1990 |
| JP | 02254300 | 10/1990 |
| JP | 2-136201 | 11/1990 |

(Continued)

OTHER PUBLICATIONS

Huang, J.; Alfonso Feria, V.; Fang, H., Improvement of the Three-Meter Ka-band Inflatable Reflectarray Antenna, Jet Propulsion Laboratory, California Institute of Technology, *IEEE Antennas and Propagation Society, AP-S International Symposium* (*Digest*), v. 1, 2001, pp. 122-125.

(Continued)

*Primary Examiner*—Jesús D. Sotelo
(74) *Attorney, Agent, or Firm*—Iandiorio & Teska

(57) ABSTRACT

An extendable spar buoy sea-based communication system includes a spar buoy having a retracted configuration deployable from an underwater vessel and an extended configuration after deployment, and a communication subsystem mounted to the top of the spar buoy and supported thereby.

70 Claims, 11 Drawing Sheets

FOREIGN PATENT DOCUMENTS

| | | |
|---|---|---|
| JP | 06141211 | 5/1994 |
| JP | 6206589 | 7/1994 |
| JP | 11298884 | 10/1999 |

OTHER PUBLICATIONS

Hoferer, Robert A., Rahmat-Samii, Yahya, Inflatable Parabolic Torus Reflector Antenna for Space-Borne Applications: Concept, Design and Analysis, Univ. of California, Los Angeles, *IEEE Aerospace Applications Conference Proceedings*, v. 3, 1999, pp. 249-263.

Huang, John, Feria, Alfonso, Inflatable Microstrip Reflectarray Antennas at X and Ka-band Frequencies, California Inst. of Technology, *IEEE Antennas and Propagation Society, AP-S International Symposium* (*Digest*), v. 3, 1999, pp. 1670-1673.

* cited by examiner

EXTENDABLE SPAR BUOY SEA-BASED COMMUNICATION SYSTEM

FIELD OF THE INVENTION

This invention relates to an improved sea-based communication system including an extendable spar buoy sea-based communication system for providing communications to and from an underwater vessel such as a submarine.

BACKGROUND OF THE INVENTION

Modern warfare frequently involves multiple branches of the military working in cooperation, and high speed and high data rate communications between the acting forces during unpredictable conditions in hostile environments is frequently necessary. Time critical targets need to be neutralized quickly. The ability to communicate high-resolution images at a very high data rate is often required. To perform and execute military missions, the effectiveness of such communications often depends on, for example, a real time data link. In another example, high-resolution intelligence surveillance and reconnaissance (ISR) images distributed by the satellite global broadcast system (GBS) may be required. In many of these situations, stealth is paramount. The sensor or communication system should not reveal the location of recipient forces or ships or otherwise compromise an operation.

Underwater vessels such as submarines often form an integral part of the battlefield scenario. Submarines can aid a variety of missions and deployment scenarios including neutralizing targets, support of special operations forces and clandestine missions, as well as enhancing linkage to other theater assets.

Submarines provide mobility, stealth and endurance for military operations. However, in the littorals or coastal regions near the sea surface, at slow speed, the probability of the submarine being detected increases and the consequences of detection are magnified. Therefore, it is advantageous for the submarine to have the ability to communicate while at sufficient depth and speed to maintain stealth and while carrying on mission functions.

Sea-based communications enable submarine participation in the battlefield scenario. High bandwidth satellite communication (SATCOM) is one enabler for submarine participation in the battlefield scenario, such as time-critical Network Centric Warfare (NCW) operations. Existing options for such communications, however, offer either high data rate communications with an antenna exposed such as for SATCOM reception/and or transmission, or stealth (with very low data rates), but not both. Known sea-based communication systems, particularly for high bandwidth submarine communications, have included mast-mounted antennas that are deployed and retracted from the submarine sail. However, deployment from the submarine sail has several drawbacks. The limited length of the mast requires that the submarine operate at relatively shallow periscope depths for extended periods of time. Wakes generated by the mast can be detectable for miles. Thus, the safety of the mission and the submarine can be compromised. Finally, the size (and hence, data rate) of retractable mast mounted SATCOM antennas are limited.

Alternatively, a variety of unmanned underwater vehicles (UUVs) have been developed or are under development for establishing communications for submerged submarines. UUVs are capable of carrying out a number of sophisticated tasks and may provide for multiple roles, i.e., communication and reconnaissance. Such systems, however, typically have a number of disadvantages. A UUV can maintain its attitude in wave motion near the surface only by operating above some minimum speed. This limits the life of the battery that powers the UUV. Also, the UUV creates a small wake which increases its detectability. Moreover, the UUV must be able to support an antenna large enough to receive GBS at a high data rate, and it must be high enough out of the water to avoid frequent sea wave upsets. To achieve these requirements, a moderately large UUV is required, at high cost. Additionally, recovery of an expensive and relatively large UUV diverts the submarine from its primary mission, and incurs additional risk of detection.

Traditional spar buoy designs are typically very large, stiff floating platforms comprising a large mass with significant righting moments. These spar buoys serve as large work platforms or data collection/telemetering buoys. One example is the ODAS Italia 1 spar buoy, which is approximately 150 feet in length with 24,000 pounds displacement. An open sea laboratory for oceanographic studies is one use of the ODAS Italia 1 spar buoy. Such designs, however, must be radically rescaled for uses where qualities such as small size and stealth are necessary or desired.

A surface floating buoy, even with deployed outriggers, also has disadvantages especially if used for communications purposes. It provides a poor platform for a stabilized antenna that must maintain its beam on a satellite in rough seas and high winds. The antenna must be high enough to minimize wind effects and wave washover, and the buoy must be large enough that wind drag on the elevated antenna will not upset it. These factors make a surface floating buoy too large for the intended purposes.

Retrievable buoys constitute another type of known buoy for use in submarine communications systems. Retrievable buoys are of modest size and may include a directional antenna on the top end. The retrievable buoy is released from a cradle on the deck a submarine, aft of the sail, and carries a data and recovery cable with it. This retrievable buoy system has a number of disadvantages. First, the concept calls for two such retrievable buoys, so that one may be active while the other is being retrieved and re-launched. Frequent release and retrieval activity produces acoustic signatures and increase the probability of detection, which is undesirable. Also, the system does not provide wideband communications at depth and speed because the buoy will reach the surface only if neither depth nor speed is excessive. Moreover, the size of the antenna that can be enclosed in the top of the retrievable buoy is too small to receive some types of communications such as wide-band GBS reception. In addition, the motion of the submarine only allows for data gathering until the data and recovery cable is depleted, which is only a few minutes due to the limited length of cable available because the cable must be strong enough to retrieve the retractable buoy. At that point, communications are interrupted and the retrievable buoy is pulled underwater and back into its cradle on the submarine.

SUMMARY OF THE INVENTION

It is therefore an object of this invention to provide an improved sea-based communication system including an extendable spar buoy for providing a stable platform for a variety of communications devices or communication subsystems.

It is a further object of this invention to provide an improved sea-based communication system including an extendable spar buoy which allows for more efficient packaging of communication subsystems when stowed.

It is a further object of this invention to provide an improved sea-based communication system including an extendable spar buoy which can be launched from an underwater vessel such as a submarine while submerged through existing launching mechanisms.

It is a further object of this invention to provide an improved sea-based communication system including an extendable spar buoy which provides ample room for a compacted and expandable communication subsystem payload such that an underwater vessel such as a submarine may transmit and receive communications at depth and speed without compromising the location or operation of the underwater vessel.

It is a further object of this invention to provide an improved sea-based communication system including an extendable spar buoy which provides a platform for real time, high bandwidth satellite signal connection to an underwater vessel at depth and speed.

It is a further object of this invention to provide an improved sea-based communication system including an extendable spar buoy which provides for down-converting satellite signals to intermediate frequency (IF) signals and decoding the IF signals to digital signals, and a modulator, upconverter and amplifier for transmitting signals to a satellite or other receiver.

It is a further object of this invention to provide an improved sea-based communication system including an extendable spar buoy at relatively low cost and which is expendable.

The invention results from the realization that an improved sea-based communications system that provides communications to and from an underwater vessel such as a submarine which maintains stealth and speed can be achieved with an extendable spar buoy deployable from the underwater vessel which includes a communication subsystem mounted to the top of and supported by the extendable spar buoy. The invention also results from the further realization that various sensors such as an extendable antenna, as well as an expandable radome, may be included as part of the communications subsystem within the extendable spar buoy which may be linked with an underwater vessel at depth.

The subject invention, however, in other embodiments, need not achieve all these objectives and the claims hereof should not be limited to structures or methods capable of achieving these objectives.

This invention features an extendable spar buoy sea-based communication system including a spar buoy having a retracted configuration deployable from an underwater vessel and an extended configuration after deployment, and a communication subsystem mounted to the top of the spar buoy and supported thereby. The extendable spar buoy may include telescoping sections, and the telescoping sections may include at least first, second and third concentric sections. The first section may extend as much as fifteen feet or more above water. The second section may include a foam flotation portion, and the third section may include an air source, a battery pack, and a cable pack. The extendable spar buoy may include an aluminum outer skin. The extendable spar buoy may be less than 15 feet long and less than 2 feet in diameter in the retracted configuration, and in the retracted configuration may be 10 feet long and 20 inches in diameter. In the retracted configuration, the spar buoy may fit within submarine torpedo or missile launch tubes. The extendable spar buoy in the extended configuration may be greater than 40 feet long, and it may be 60 feet long in the extended configuration.

The communication subsystem may have a compact configuration when the extendable spar buoy is stowed and initially deployed and an extended configuration on top of the spar buoy after the spar buoy is extended. The communication subsystem may include a sensor having a compact configuration when the spar buoy is stowed and initially deployed and an extended configuration on top of the spar buoy after the spar buoy is extended. The spar buoy in the retracted configuration may include the sensor in the compact configuration. The sensor may be an antenna configured to receive and/or transmit data. The communication subsystem may include an antenna having a compact configuration when the spar buoy is stowed and initially deployed and an extended configuration on the top of the spar buoy after the spar buoy is extended, and a radome having a compact configuration when the spar buoy is stowed and initially deployed and an expanded configuration on the top of the spar buoy and about the antenna when the antenna is extended. The communication subsystem in the retracted configuration may include the antenna in the compact configuration and may include the radome in the compact configuration. The radome may be a reduced Radar Cross Section (RCS) radome.

The extendable spar buoy sea-based communication system may further include an antenna positioning subsystem for positioning the antenna, and the antenna positioning subsystem may include a deployment control subsystem. The antenna positioning subsystem may also include a pedestal positioning subsystem for positioning and pointing the antenna. The communication system may further include an electronic subsystem for detecting the position of the antenna and it may include a tracking antenna control subsystem for tracking a satellite. The communication system may include down-converter and a low noise block (LNB) pre-amplifier for down-converting satellite signals to intermediate frequency (IF) signals, and it may further include a modulator for converting data to be transmitted to an IF signal, an upconverter for converting the IF to an RF signal and a transmit amplifier for providing transmission capability of frequencies up to 45 GHZ. Additionally, the communication system may also include a communication link between the spar buoy and the underwater vessel. The communication link may include optical fiber and the optical fiber may be a fiber optic microcable or it may be a low-cost buffered fiber. There may be a spool of optical fiber on the spar buoy or a spool of optical fiber on the underwater vessel, or there may be a spool of optical fiber on the spar buoy and a spool of optical fiber on the underwater vessel. The underwater vessel may be a submarine.

This invention also features an extendable spar buoy sea-based communication system including a spar buoy having a retracted configuration deployable from a firing tube in an underwater vessel, and an extended configuration including a lengthy section above water after deployment, an antenna having a compact configuration when the spar buoy is stowed and initially deployed and an extended configuration on the top of the spar buoy after the spar buoy is extended, and a radome having a compact configuration when the spar buoy is stowed and initially deployed and an expanded configuration on the top of the spar buoy and about the antenna when the antenna is extended.

This invention further features an extendable spar buoy sea-based communication system including spar buoy including concentric telescoping sections and having a retracted configuration deployable from an underwater vessel and an extended configuration after deployment, an antenna having a compact configuration when the spar buoy is stowed and initially deployed and an extended configuration on the top of the spar buoy after the spar buoy is extended, a radome having a compact configuration when the spar buoy is stowed and initially deployed and an expanded configuration on the top of the spar buoy and about the antenna when the antenna is extended, a communication link between the spar buoy and the underwater vessel, and an antenna positioning subsystem for positioning the antenna.

This invention also features an extendable spar buoy sea-based communication system including a spar buoy including telescoping sections and having a retracted configuration deployable from an underwater vessel and an extended configuration after deployment, an antenna having a compact configuration when the spar buoy is stowed and initially deployed and an extended configuration on the top of the spar buoy after the spar buoy is extended, a radome having a compact configuration when the spar buoy is stowed and initially deployed and an expanded configuration on the top of the spar buoy and about the antenna when the antenna is extended, and an optical fiber communication link between the spar buoy and the underwater vessel.

This invention further features an extendable spar buoy sea-based communication system including a spar buoy including telescoping sections and having a retracted configuration deployable from an underwater vessel and an extended configuration after deployment, a communication subsystem mounted to the top of the spar buoy and supported thereby, and an optical fiber communication link between the spar buoy and the underwater vessel.

This invention also features a method for establishing sea-based communication to and from an underwater vessel including deploying from the underwater vessel an extendable spar buoy having a retracted configuration before deployment and an extended configuration after deployment, the spar buoy including a communication subsystem mounted to the top of the spar buoy and supported thereby and having a compact configuration when the spar buoy is stowed and initially deployed and an extended configuration on the top of the spar buoy after the spar buoy is extended, extending the communication subsystem, and communicating data received by the communication subsystem to the underwater vessel and communicating data from the underwater vessel to a communication subsystem for transmission to a satellite or other receiver.

This invention further features a method for establishing sea-based communication to and from an underwater vessel including deploying from the underwater vessel an extendable spar buoy having a retracted configuration before deployment and an extended configuration after deployment, the spar buoy including an antenna having a compact configuration when the spar buoy is stowed and initially deployed and an extended configuration on the top of the spar buoy after the spar buoy is extended, and a radome having a compact configuration when the spar buoy is stowed and initially deployed and an expanded configuration on the top of the spar buoy and about the antenna when the antenna is extended. The method further includes expanding the radome, extending the antenna, and communicating data received by the antenna to the underwater vessel and communicating data from the underwater vessel to a communication subsystem for transmission to a satellite or other receiver. The extendable spar buoy may include telescoping sections, and the telescoping sections may include at least first, second and third concentric sections. The method may further include extending at least fifteen feet above water the first section of the extendable spar buoy in the extended configuration. The method may further include disposing a foam flotation portion in the second section, and may further include disposing an air source, a battery pack, and a cable pack in the third section. The spar buoy may include an aluminum outer skin, and the spar buoy in the retracted configuration may include the antenna in the compact configuration and the radome in the compact configuration. In the retracted configuration the extendable spar buoy may be less than 15 feet long and less than 2 feet in diameter. Also, in the retracted configuration the spar buoy may be 10 feet long and 20 inches in diameter. In the extended configuration the extendable spar buoy may be greater than 40 feet long. Also, in the extended configuration the extendable spar buoy may be 60 feet long. The radome may be a reduced Radar Cross Section (RCS) radome. The method may further include positioning the antenna, detecting the position of the antenna, and tracking a satellite. Communicating data may include communicating data via an optical fiber. The method may also include disposing the optical fiber about a spool on the spar buoy, or about a spool on the underwater vessel, or about a spool on the spar buoy and about a spool on the underwater vessel.

The invention further features a method for establishing sea-based communication to and from an underwater vessel including deploying from the underwater vessel an extendable spar buoy having telescoping sections and having a retracted configuration before deployment and an extended configuration after deployment, the spar buoy including an antenna having a compact configuration when the spar buoy is stowed and initially deployed and an extended configuration on the top of the spar buoy after the spar buoy is extended, and a radome also having a compact configuration when the spar buoy is stowed and initially deployed and an expanded configuration on the top of the spar buoy and about the antenna when the antenna is extended, expanding the radome and extending the antenna, positioning the antenna to transmit and receive data, and communicating the data received by the antenna to the underwater vessel and communicating data from the underwater vessel to a communication subsystem for transmission to a satellite or other receiver.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
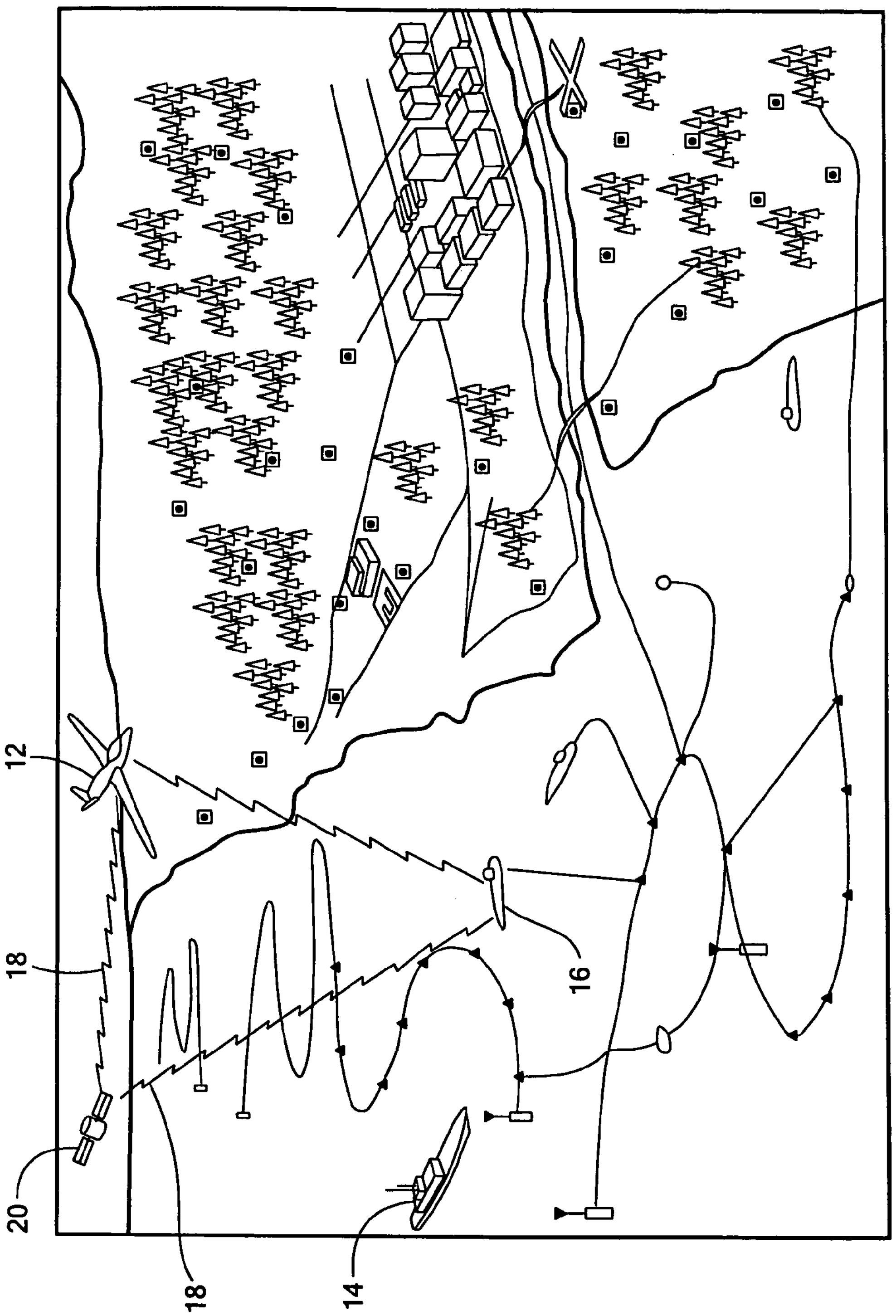
FIG. 1 is a schematic depiction of a typical naval littoral operating theater.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, in the naval littoral combat scene shown in FIG. 1, multiple forces, including Naval Aviation 12, surface Navy 14, and army or marine ground forces, work in cooperation. Underwater vessels such as submarines 16 cooperate with all of the forces. Communications such as images 18 distributed by satellite Global Broadcast System (GBS) 20 can be utilized by the all forces.

In contrast to existing systems, the present invention provides sea-based communications by way of a compact, expandable and expendable system that may be deployed from a submarines' existing torpedo or missile launch tubes.

Figure 2:
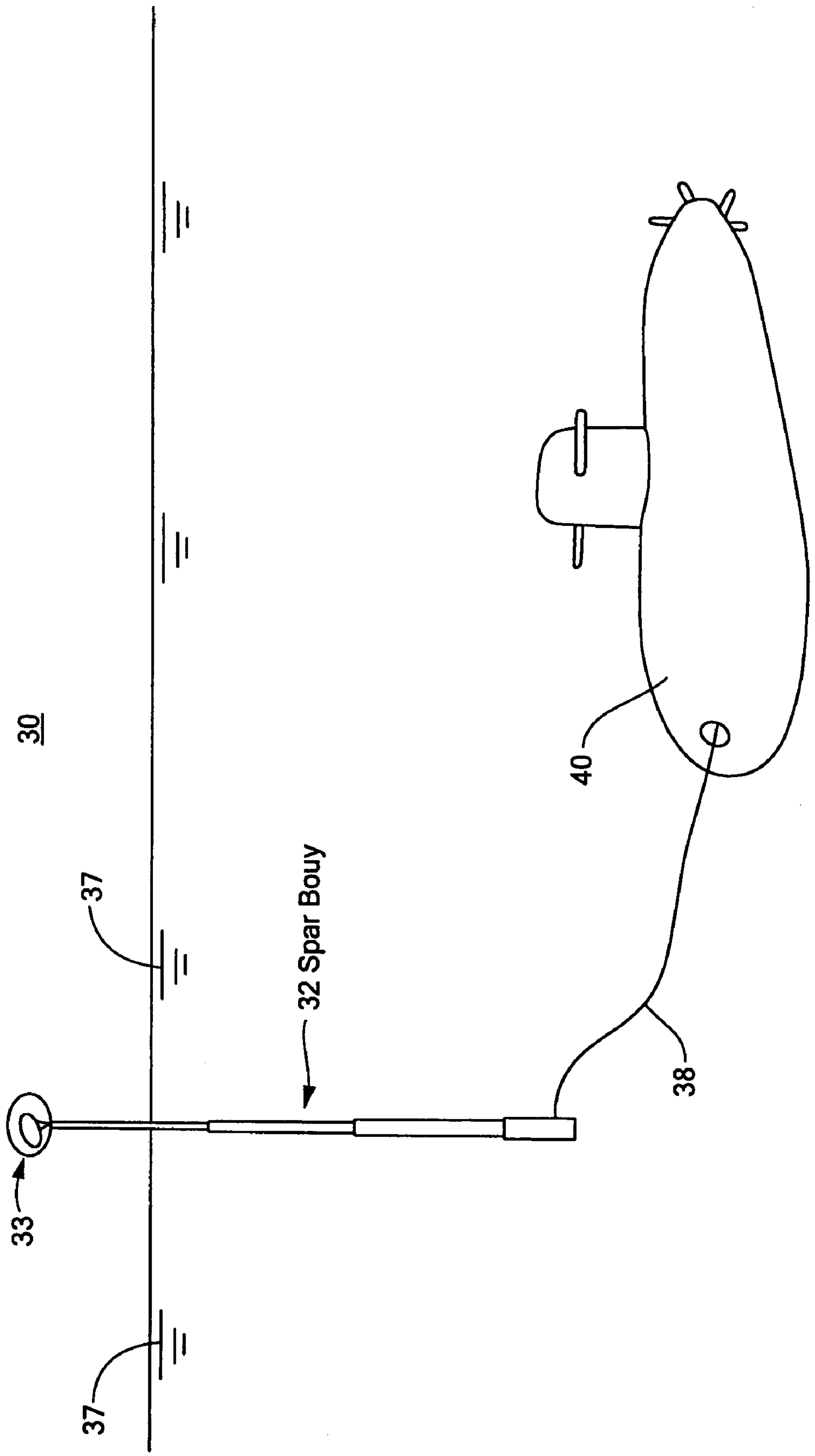
FIG. 2 is a schematic view of an extendable spar buoy sea-based communication system in accordance with the present invention connected to an underwater vessel.

There is shown in FIG. 2 extendable spar buoy sea-based communication system and method 30 in accordance with the present invention. Extendable spar buoy sea-based communication system 30 includes extendable spar buoy or spar buoy 32 having a retracted configuration deployable from underwater vessel 40, i.e. a submarine, an extended configuration (as shown) after deployment. Extendable spar buoy sea-based communication system 30 also includes communication subsystem 33 mounted to the top of spar buoy 32 and supported thereby. Spar buoy 32 is configured to provide a stable platform in open sea conditions, decoupling communication subsystem 33 from wave motion 37 and allowing spatial separation of spar buoy 32 from underwater vessel 40. Communication link 38 may link spar buoy 32 with underwater vessel 40.

Figure 3A:
FIGS. 3A–3E are schematic views of the sequence of deployment of the extendable spar buoy in accordance with the present invention.

In particular, extendable spar buoy 32 is configurable to have the retracted configuration shown in FIG. 3A. In the retracted configuration, spar buoy 32 is compatible in size with existing submarine torpedo storage racks and firing tubes. Spar buoy 32 thus minimizes space in the tightly constrained submarine pressure hull volume, and as retracted resembles a standard submarine ordnance, both valuable advantages. Indeed, spar buoy 32 is configured to be fired and deployed from existing submarine firing tubes, and therefore no additional or independent launching mechanisms are necessary, thus providing another valuable advantage.

Figure 3B:
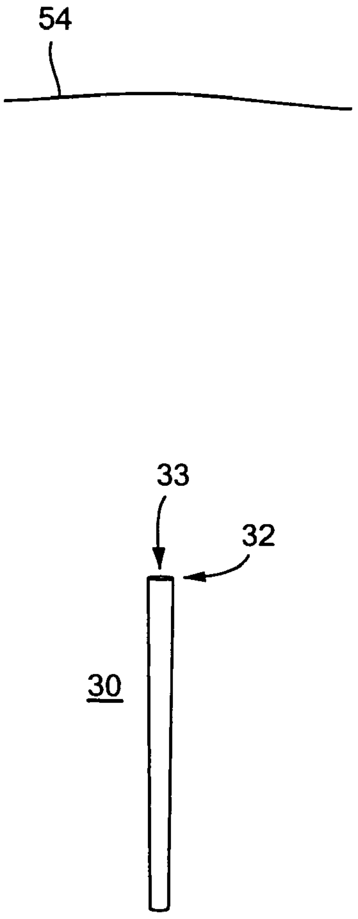
Figure 3C:
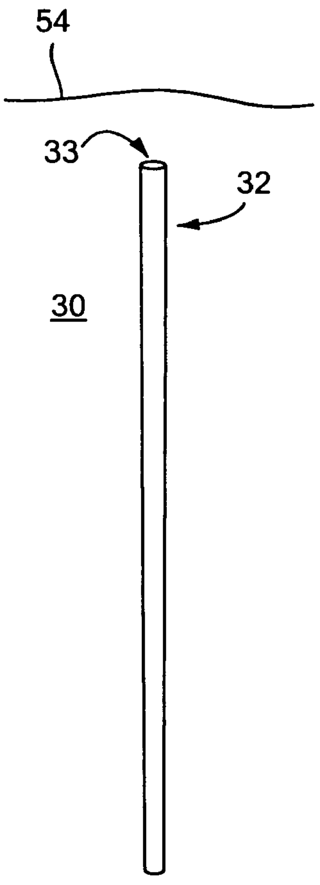
Figure 3D:
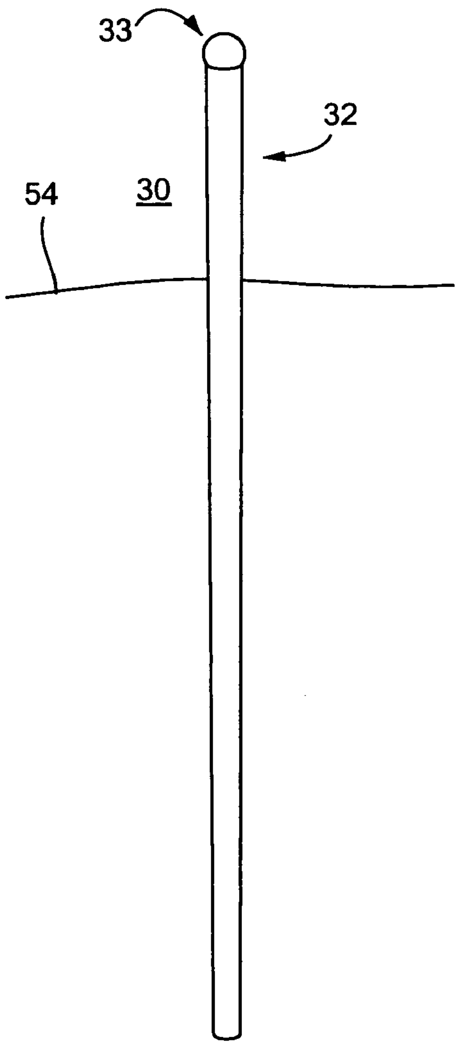

Spar buoy 32 is deployable at depth, and is not surface deployed. The deployment sequence of spar buoy 32 is shown (not to scale) in FIGS. 3A–3E. Upon deployment, spar buoy 32 extends from the retracted configuration, see FIG. 3B, and simultaneously ascends toward sea surface 54, FIG. 3C. Communication subsystem 33 is mounted to the top of spar buoy 32 and supported thereby. After surfacing, the components of communication subsystem 33 may be deployed, FIG. 3D. In the example shown in FIG. 3D, communication subsystem 33 includes radome 34 on top of spar buoy 32 which deploys from a compact configuration to the extended configuration shown in FIG. 3E. Radome 34 may surround and protect sensor 35, which may be, in one example antenna 36, as well as associated amplifiers and converters as discussed further below. In the retracted configuration, radome 34 and antenna 36 are within pill box 90, FIG. 5, within spar buoy 32 as discussed more fully below.

Figure 4:
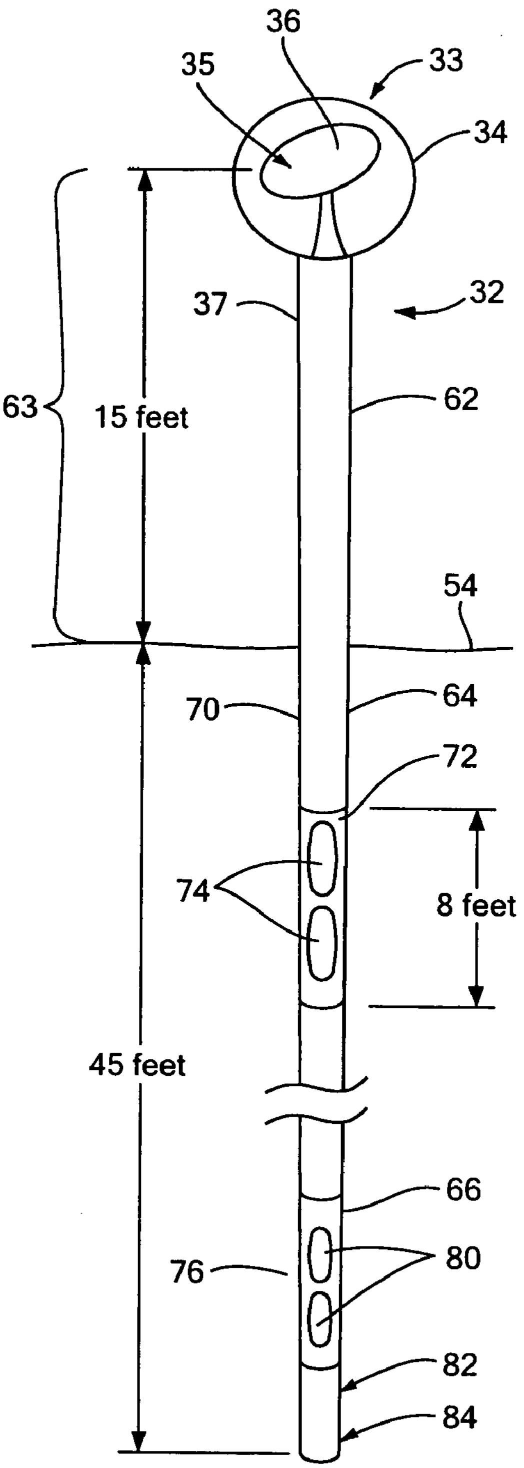
FIG. 4 is a more detailed schematic view of the extendable spar buoy of FIG. 2 in an extended configuration.

The multiple sections of spar buoy 32 are configured to form a retracted configuration (as shown in FIG. 3A) deployable from an underwater vessel, a submarine for example, and the multiple sections are also configured to form an extended configuration after deployment of spar buoy 32. FIG. 4 shows a more detailed view of spar buoy 32 in the extended configuration as it appears when deployed, including multiple sections 62, 64 and 66. While extendable spar buoy 32 is not limited to any specific number of sections, it will include multiple sections, typically three sections, and may include six to eight sections, which are typically telescoping sections and are typically concentric. These multiple sections typically include mast section 62, flotation section 64, and storage section 66. In one example, a hollow center cylinder 37, which may be approximately sixteen to eighteen inches, is included in extendable spar buoy 32. Flotation section 64 is sealed, typically by sealing an annular cylinder surrounding flotation section 64.

In the extended configuration, spar buoy 32 is greater than forty feet long, with a lengthy section, particularly mast section 62, above water line or sea surface 54. Mast section 62 is typically as much as fifteen feet or more above water line 54. This fifteen feet of "freeboard" decreases the impact of high Sea State conditions, i.e. waves and wind, on the antenna 36 and radome 34. As much as forty-five feet of spar buoy 32 may be below water line 54.

Spar buoy 32 is able to survive ejection from a torpedo tube, float to the surface, extend, and restrain deflections from wave activity and wind loading in conditions up to Sea State 5. In one example, spar buoy 32 includes aluminum outer skin 70. Flotation section 64 includes foam or rigid flotation portion 72 which will be at the water line region when extendable spar buoy 32 is deployed, and/or internal inflatable bladders 74. Aluminum outer skin 70 provides ruggedness and rigidity. Flotation section 64 raises the center of buoyancy (Cb) and provides an ample and proper righting moment to maintain the verticality of spar buoy 32. Ballast 76 lowers the center of gravity (Cg) of spar buoy 32 and achieves displacement. Ballast 76 together with flotation portion 72 make spar buoy 32 self-righting. Storage section 66 of spar buoy 32 includes air source 80, battery pack 82, and cable pack 84. Ballast 76 includes air source 80, battery pack 82, and additional ballast such as lead, as required for a particular application.

Thus, extendable spar buoy 32 is designed to float to the surface to position communication subsystem 33 while achieving effective decoupling of communication subsystem 33 from surface wave activity and wind loading. It will be apparent to those skilled in the art that various materials and various Cb and Cg values may be chosen depending on a particular application or particular desired parameters.

In the retracted configuration, FIG. 3A, spar buoy 32 is the size of storage section 66, FIG. 4. In one example, retracted spar buoy 32 is less than fifteen feet long and has a diameter of less than two feet. Preferably, in the retracted configuration, spar buoy 32 has a length of ten feet and a diameter of twenty inches. Storage section 66 is at the bottom when spar buoy 32 is extended.

When spar buoy 32 is retracted, storage section 66 is typically the innermost section of telescoping sections 62, 64, 66. Spar buoy 32 in the retracted configuration is shown in more detail in FIG. 5. Air source 80, battery pack 82, and cable pack 84 also fit into the retracted configuration. A payload 88, such as communication subsystem 33, may be included in pill box 90. Communication subsystem 33 may include any type of compactible sensor, or any sensor the size of pill box 90 or smaller. In one example, the sensor may be an antenna, and communication subsystem 33 may further include a radome. Of course, the sensor such as the antenna may also have an extended configuration after the spar buoy is extended. In the example of an antenna system, pill box 90 would include antenna 36, FIG. 4, and radome 34, in their compact configurations.

Figure 5:
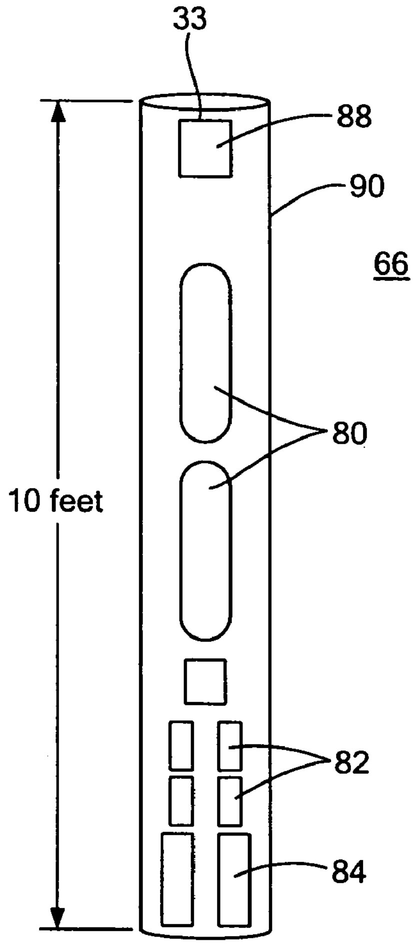
FIG. 5 is a more detailed view of the extendable spar buoy of FIG. 2 in a retracted configuration.

In one embodiment, air source 80, FIG. 5 is compressed gas contained in gas bottles which extends spar buoy 32 from the retracted configuration to the extended configuration (as shown in FIG. 4) and inflates internal bladders 74 in flotation section 64 to provide buoyancy. Battery pack 82, FIG. 5 provides power as needed in spar buoy 32, including providing power to, for example, an antenna positioning subsystem. In contrast to known retrievable buoys and systems as discussed in the background section above which have high power requirements, the present invention has relatively low power requirements due to the design, components, and configuration as described herein, as well as the expendable nature of the spar buoy.

Although extendable spar buoy 32 in accordance with the present invention may be shaped and sized to fit a particular application, preferable design parameters for spar buoy 32 in the extended configuration include a length of sixty (60) feet, 2000 lb. in air weight, 12.6 $in^2$ surface piercing area, as well as Cg at forty-five feet from the top of the spar and Cb at twenty-five feet from the top of the spar. Analysis based on these design parameters shows that spar buoy 32 will have a vertical response which oscillates with a 21.2 second period. Modeled as a critically damped one degree of freedom spring mass system under these conditions, spar vertical excursion is predicted to be approximately 32 inches, more than 80% attenuation of the wave surface motion. Other sets of parameters providing performance in different sea states, or for different payloads, also exist within the scope of the invention.

Typically, loads on a spar buoy are induced by orbital wave motion from the sea surface to the bottom of the spar buoy. The orbital diameter diminishes with depth as a function of wave height and wave length. The period however, remains the same throughout the water column. Thus, a 9.7 second period wave will impart a particle motion with an orbital period of 9.7 seconds regardless of depth. The most significant wave loading will, therefore, be experienced in the region near the surface.

A first order analysis has been performed to predict spar roll and horizontal motion at various Sea State conditions based on the foregoing design parameters for the spar buoy of the present invention. The predicted tilt and displacement as a function of Sea State, tabulated in Table 1, indicate that the present spar buoy design will provide a sufficiently stable platform to acquire sea-based communications.

TABLE 1

| Sea State (ref) | Wave Hgt (ft) | Period (sec) | Tilt at Dome (deg) | Lateral Excursion (ft) |
|---|---|---|---|---|
| 1 | 1.2 | 3.4 | 0.74 | 0.49 |
| 2 | 3.7 | 5.4 | 1.67 | 1.07 |
| 3 | 5.8 | 6.5 | 2.98 | 1.76 |
| 4 | 8.7 | 7.7 | 6.10 | 3.60 |
| 5 | 16.0 | 9.7 | 14.80 | 8.70 |
| 6 | 23.0 | 11.3 | 23.00 | 13.20 |

After communications are effected and the mission is completed, spar buoy 32 can be scuttled. During the mission time, spar buoy 32 may be used as a platform for sea-based communications such as satellite communications, although the present invention is not limited to such use.

Figure 3E:
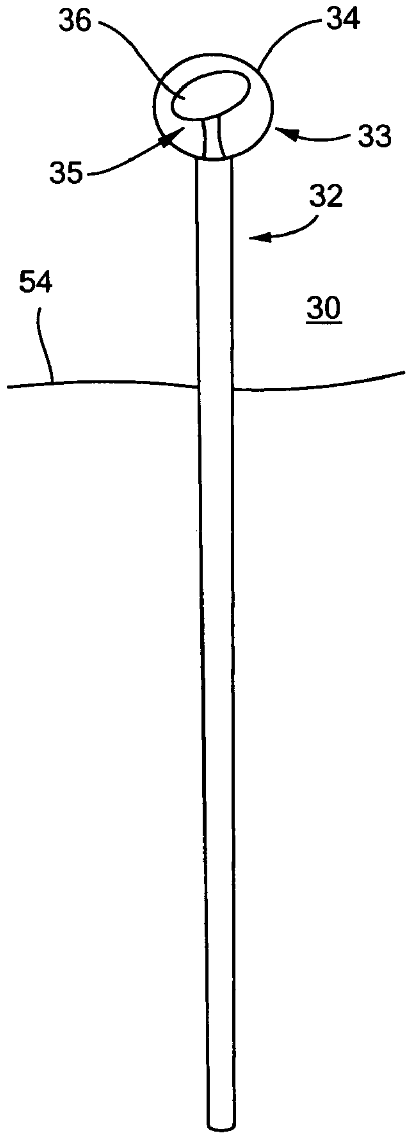

Overall, communication subsystem 33, FIGS. 3A–3E, has a compact configuration when extendable spar buoy 32 is stowed and initially deployed and an extended or expanded configuration on top of spar buoy 32 after spar buoy 32 is extended. When extendable spar buoy 32, FIG. 3A, is deployed (and prior to deployment during storage), communication subsystem 33 is in a compact configuration to fit within pill box 90. When extendable spar buoy 32, FIG. 3E, is deployed fully, communication subsystem 33 is in an extended or expanded configuration.

As noted above, in one example, communication subsystem 33, FIG. 4 includes sensor 35, with sensor 35 having a compact configuration when spar buoy 32 is stowed and initially deployed and an extended configuration on top of spar buoy 32 after spar buoy 32 is extended. Communication subsystem 33 also includes amplifiers and converters, as discussed in more detail below. In this example, spar buoy 32 in the retracted configuration includes sensor 35 in the compact configuration. Preferably, sensor 35 is an antenna such as antenna 36. Sensor 35 may also include other types of sensor devices such as high gain reflector antennas or phased array antennas (electronically scanned in two directions or a combination of electronic scan in one dimension and mechanical scan in the other dimension). Notably, high gain reflector antennas operate at frequencies up to 45 GHz, which supports transmit capability as well as receiving capability. These capabilities enable communications to and from a variety of satellites and include GBS, Ka-band, and EHF (extremely high frequency) satellite signals.

When spar buoy 32, FIG. 3A, is stowed and initially deployed, communication subsystem 33, FIG. 5, including antenna 36 and radome 34 (not shown) within communication subsystem 33 are in their compact configurations to fit within pill box 90. When spar buoy 32, FIG. 3E, is deployed, antenna 34 within communication subsystem 33 is in the extended configuration, FIG. 6, and radome 34 is in its expanded configuration.

Figure 6:
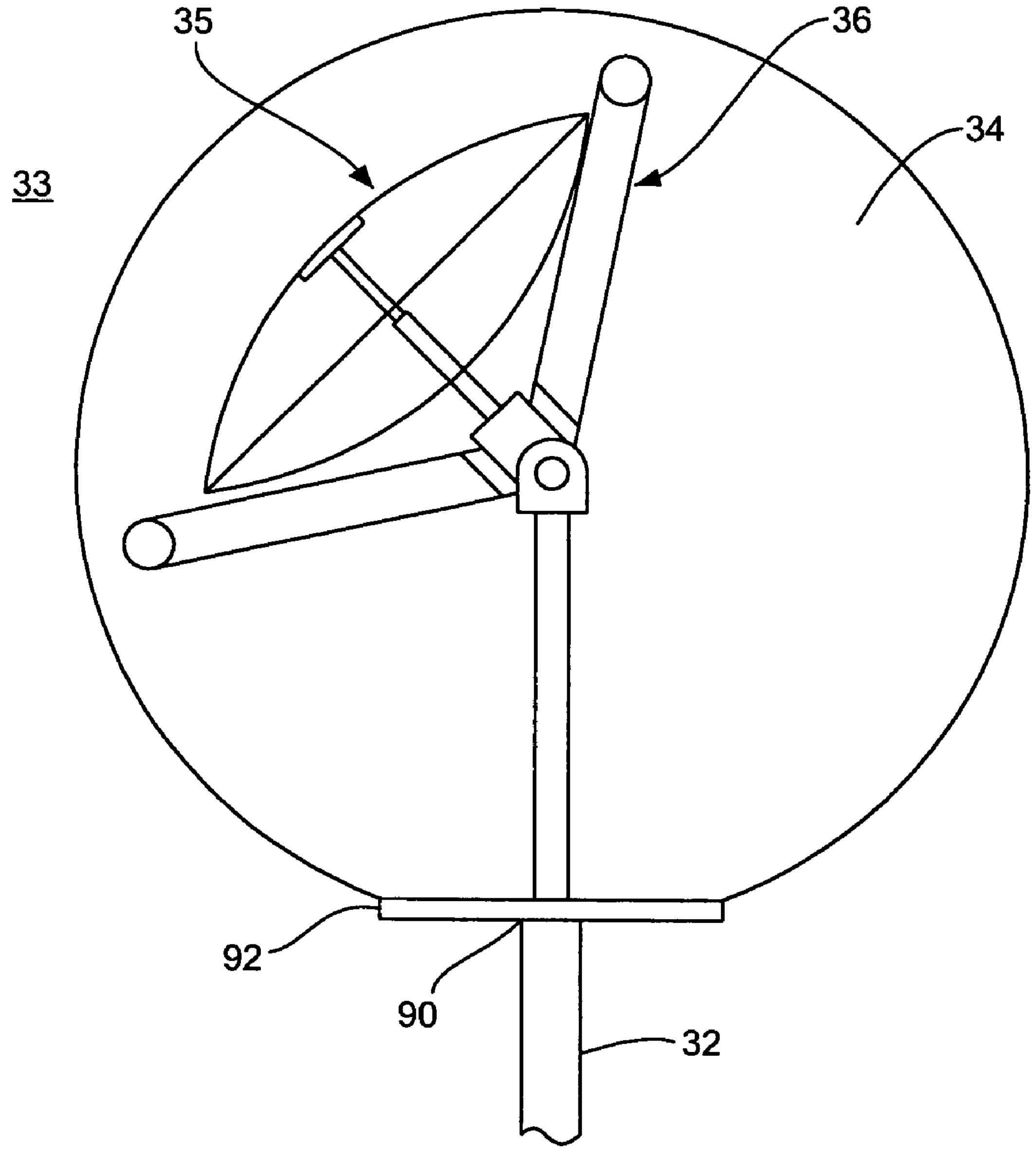
FIG. 6 is an enlarged schematic view of one example of a communication subsystem in accordance with the present invention, namely an antenna and a radome, both in the deployed configuration.

FIG. 6 shows an enlarged view of radome 34 and antenna 36, both on the top 90 of spar buoy 32. After spar buoy 32 is fully deployed, radome 34 and antenna 36 are deployed from their compact configurations. Radome 34 and antenna 36 may be inflatable, as known in the art, see, e.g. Improvement of the Three-meter Ka-band Inflatable Reflectarray Antenna, Huang, J. Feria, A.; Fang, H., (Jet propulsion Laboratory, California Institute of Technology *IEEE Antennas and Propagation Society, AP-S International Symposium* (*Digest*), v. 1, 2001, pp. 122–125; Inflatable Parabolic Torus Reflector Antenna for Space-Borne Applications: Concept, Design and Analysis, Hoferer, Robert A., Rahmat-Samii, Yahya, (Univ of California, Los Angeles), *IEEE Aerospace Applications Conference Proceedings*, v. 3, 1999, pp. 249–263; and Inflatable Microstrip Reflectarray Antennas at X and Ka-band Frequencies, Huang, John, Feria, Alfonso, (California Inst of Technology), *IEEE Antennas and Propagation Society, AP-S International Symposium* (*Digest*), v. 3, 1999, pp. 1670–1673.

In such a case, radome 34 and antenna 36 inflate, and an antenna pointing subsystem and electronic subsystem, which may also be included, allow antenna 36 to point to satellite 20, FIG. 1. Radome 34, FIG. 6 houses and protects antenna 36 from the environment. Base 92 for radome 34 and antenna 36 is attached directly to spar buoy 32. Radome 34 and antenna 36 are shown in their extended and expanded configurations. As shown in FIG. 6, radome 34 may be spherical. When expanded, radome 34 is large enough to accommodate the full range of motion of antenna 36. Typically, radome 34 is deployed after spar buoy 32 has surfaced, FIG. 3E, but before the deployment of antenna 36, FIG. 6.

As noted, previously known communications systems achieve sea-based communications such as SATCOM capability, or stealth, but not both. One factor in achieving the desired high data rate, e.g., 24 Mbps GBS data rate, is the received signal strength, which is a function of antenna efficiency and size, and antenna efficiency depends on a variety of factors including the transparency of the radome surrounding the antenna and surface accuracy of the reflector surface of the antenna. The present invention provides a suitable platform such that compatible antennae and radomes that provide greater efficiency and size may be utilized while remaining effective and maintaining stealth.

Also, in contrast to existing radomes such as the thick radome surrounding mast mounted antennas, radome 34 may be thin lightweight, and expandable from a small volume. To help achieve greater efficiency through transparency, radome 34 may include polyester polyarylate fibers as described in U.S. patent application Ser. No. 10/620,884 which is incorporated herein by reference. Also for increased military utility, radome 34 may be a reduced Radar Cross Section (RCS) radome. In one example, a low radar cross section radome such as the radome described in U.S. Pat. No. 6,639,567 may be utilized, and U.S. Pat. No. 6,639,567 is hereby incorporated herein by reference. In addition, the radome may include seams such as the seams described in U.S. patent application Ser. No. 10/620,888, which is incorporated herein by reference.

The extendable spar buoy sea-based communication system of the present invention may include additional subsystems in accordance with the particular sensor or system, or communications system, with which it is being used. In the above example, where the sensor utilized is an antenna, spar buoy 32 typically includes communication subsystem 33 which may include an antenna positioning subsystem, FIGS. 7A and 7B. Antenna positioning subsystem 400 on spar buoy 32 may include deployment control subsystem 402 for deploying, such as inflating, antenna 36, and for example, radome 34. Pedestal positioning subsystem 404 for pointing and positioning antenna 36 may be included. Closed loop control, for example, may be utilized to track communications from a GBS satellite and to compensate for motion of spar buoy 32. Antenna positioning subsystem 400 may also include attitude reference unit 406 for providing attitude reference for the closed loop control logic. A commercial off-the-shelf antenna pointing system may be used. Motions induced by the Sea State are sensed and compensated for by accelerometer 407. Once acquired, received communication data can be down-converted from Ka-band to L-band by a Ka-band to L-band frequency converter and transferred to inboard electronic subsystem 408 in underwater vessel 40, FIG. 8, via communication link 38. A low noise block (LNB) pre-amplifier 409 and a down-converter 411, FIG. 7A, may also be included. At the antenna, down-converter 411 down-converts satellite signals to intermediate frequency (IF) signals. This digital signal is sent to IF line out 403. Transmit amplifier 420 and up-converter 419 provide IF up-conversion to RF and transmission capability of frequencies up to 45 GHz, which includes communications for a variety of satellites. As noted above, for such sea-based communication, a high gain reflector antenna, for use in the communication subsystem of the present invention, is preferred.

Figure 7C:
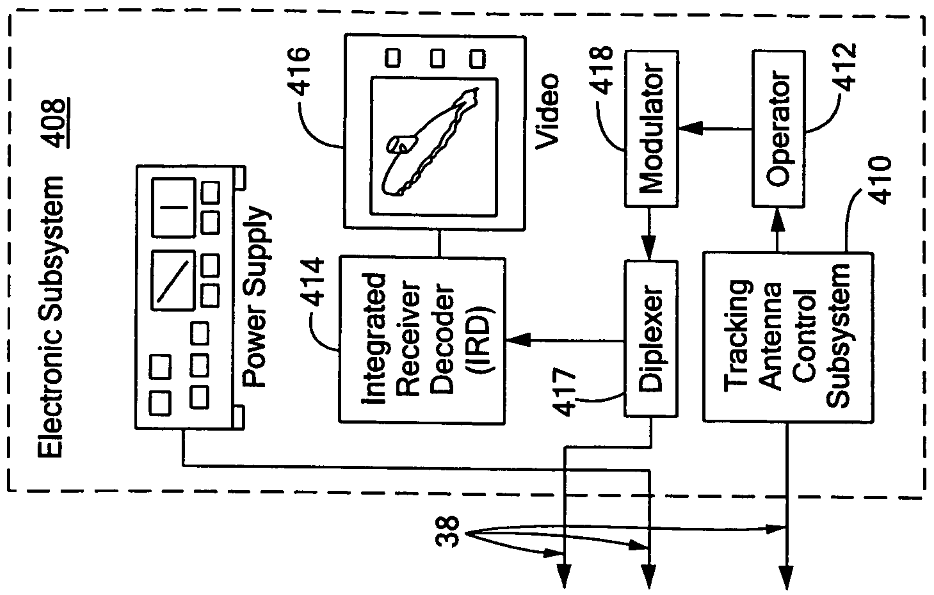
FIGS. 7A–7C are schematic views of one configuration of various systems such as an antenna positioning subsystem and electronic subsystem for use with the present invention.
Figure 7B:
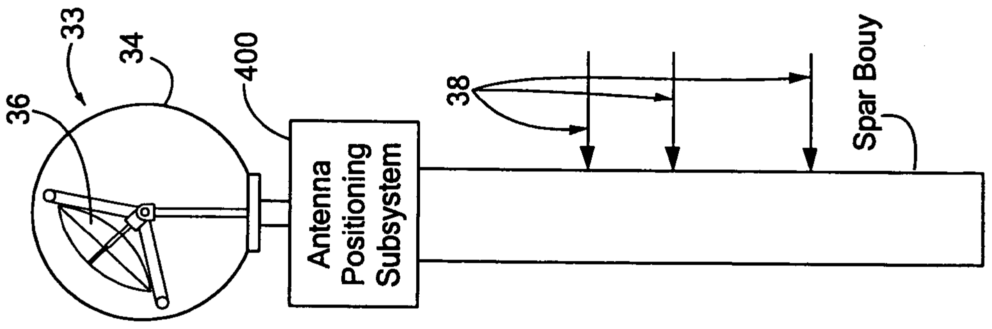
Figure 7A:
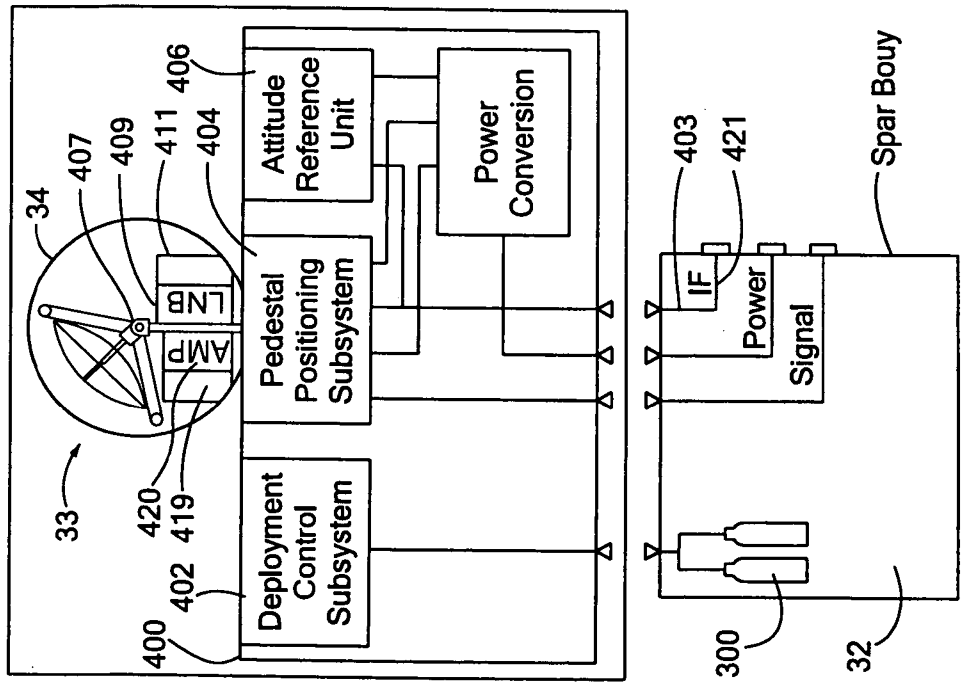

The extendable spar buoy of the present invention may be linked to electronic subsystem 408, FIG. 7C, which detects the position of antenna 36 and which may include tracking antenna control subsystem 410 for tracking satellite 20, as shown in FIG. 1. Operator 412 using, for example, a laptop or other computer inboard a submarine can control the position of antenna 36 through antenna positioning subsystem 400. An integrated receiver decoder (IRD) 414 converts the IF signal from LNB pre-amplifier 409 to video or other data. For example, IRD 414 may provide high-resolution and persistent intelligence, surveillance and reconnaissance images 416 to the operator, such as common operating pictures of Ashore Operating Area (AOR). Diplexer 417 allows for combining both transmitted and received IF signals onto the IF signal conductor 421. Data may be transmitted from the underwater vessel to communication subsystem 33 for transmission to a satellite or other receiver. This data may come from operator 412, by way of a computer or a laptop computer, for example. Modulator 418 converts data to be transmitted to a satellite into an IF signal that is up-converted to an RF signal and amplified by amplifier 420. It can be seen that the present invention can be utilized with various sensors and subsystems while still providing compactness, efficiency and stealth.

Figure 8:
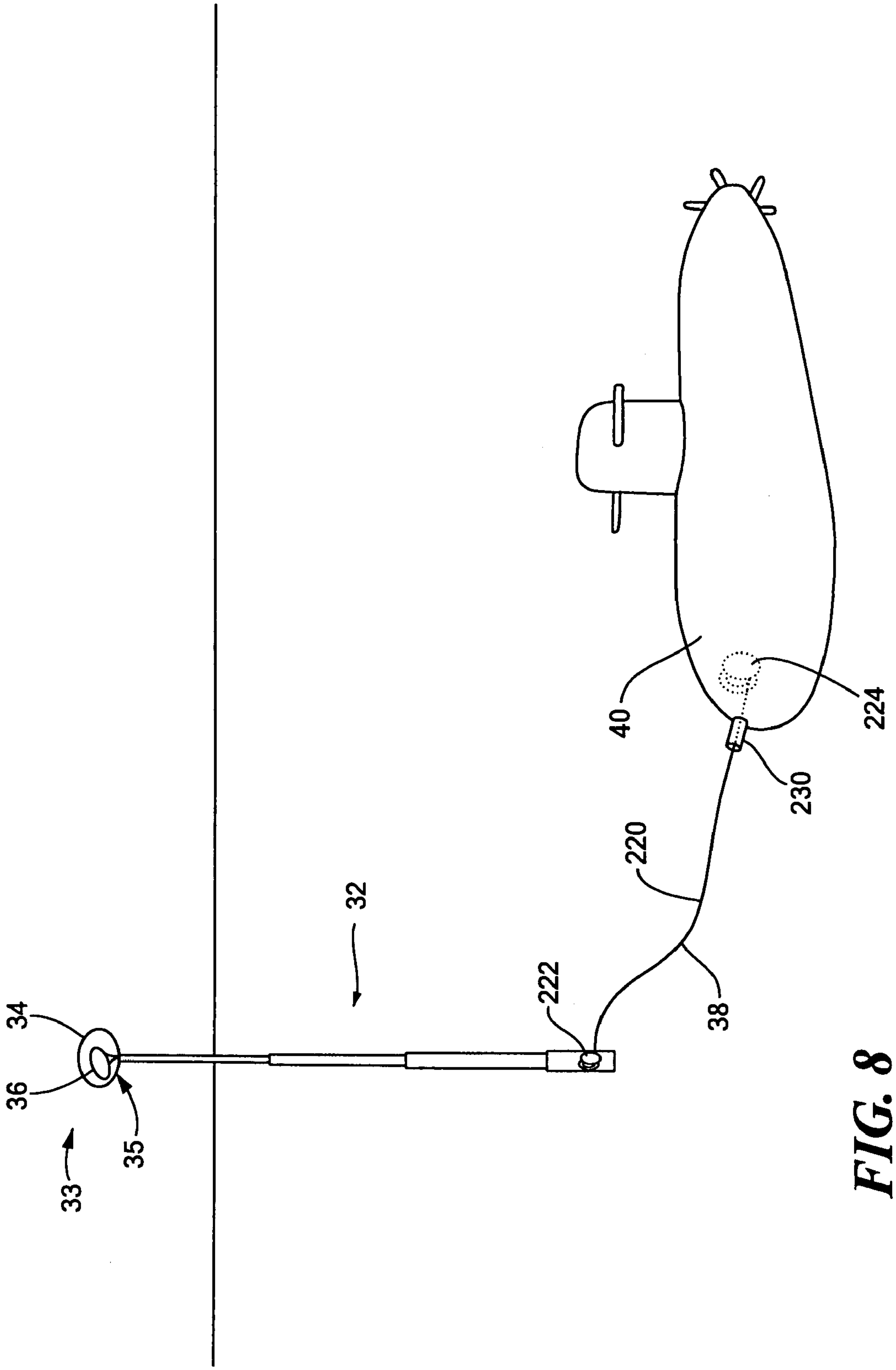
FIG. 8 is a more detailed schematic view of a communication link between the extendable spar buoy and underwater vessel shown in FIG. 2.

Communication link 38, FIG. 8, provides linking between extendable spar buoy 32 and the ultimate destination or source of information or data. As shown, the destination or source is underwater vessel 40. Data and information, including data received from satellite 20, or operator commands for controlling the antenna position, and transmitted data as discussed above for example, may be exchanged through communication link 38. Communication link 38, preferably an optical fiber communication link using a free drifting optical fiber, is superior to known acoustic down-linking and direct optical transmission. Acoustic downlinking is unsatisfactory because of bandwidth limitations of about 1 Kbps to a range of about 10 kilometers, and lower data rates for longer ranges. Direct optical transmission through the sea would be limited to a few hundred meters and would require close proximity between the underwater vessel 40, such as a submarine, and spar buoy 32, potentially compromising stealth and utility.

In the example of an antenna as the sensor, communication link 38 establishes a connection between antenna 36 and underwater vessel 40 after spar buoy 32, radome 34, and antenna 36 are deployed. In one example, communication link 38, FIG. 8 is optical fiber 220. Spool 222 for optical fiber on spar buoy 32 is included in cable pack 84, FIGS. 4 and 5. Underwater vessel 40, FIG. 8 also typically includes spool 224 for optical fiber payout from underwater vessel 40. Optical fiber 220 can be payed out from each of spools 222 and 224 during deployment and ascension of spar buoy 32 to the water surface 54 (as shown in FIGS. 3A–3E), or from one spool. Optical fiber 220 is payed out from spool 224 to accommodate movement of underwater vessel 40, and optical fiber 220 is payed out from spool 222 to accommodate buoy drift relative to local water mass as it surfaces and drifts with wind and current shear. In contrast to some currently known systems, optical fiber 220 is not used to tow or hold spar buoy 32 in position. Further, this two-way pay-out of optical fiber 220 further eliminates towing forces. Therefore, stresses on optical fiber 220 will be minimized, as well as any wake generation that may compromise the position of underwater vessel 40. Optical fiber 220 may include fiber optic microcable (FOMC) or low cost buffered fiber (LCBF). These commercially available optical fibers support high data rate transmission without repeaters for the distance required, they can be spliced and spooled, and they require no special coatings or protection from the sea environment due to the relatively short usage time.

In one configuration, one or both ends of optical fiber 220 include flex tube 230 to protect optical fiber 220 as it is payed out of spools 222 and 224. Flex tube 230 protects optical fiber 220 from abrasion and by its relative rigidity prevents optical fiber 220 from being drawn into the propeller of underwater vessel 40. While it will be recognized by those skilled in the art that the length of optical fiber 220 may vary depending upon a desired application, typically the length will be at least 50 kilometers with an estimated pay out time of approximately nine hours with the underwater vessel travelling at a speed of 3 knots.

Figure 9:
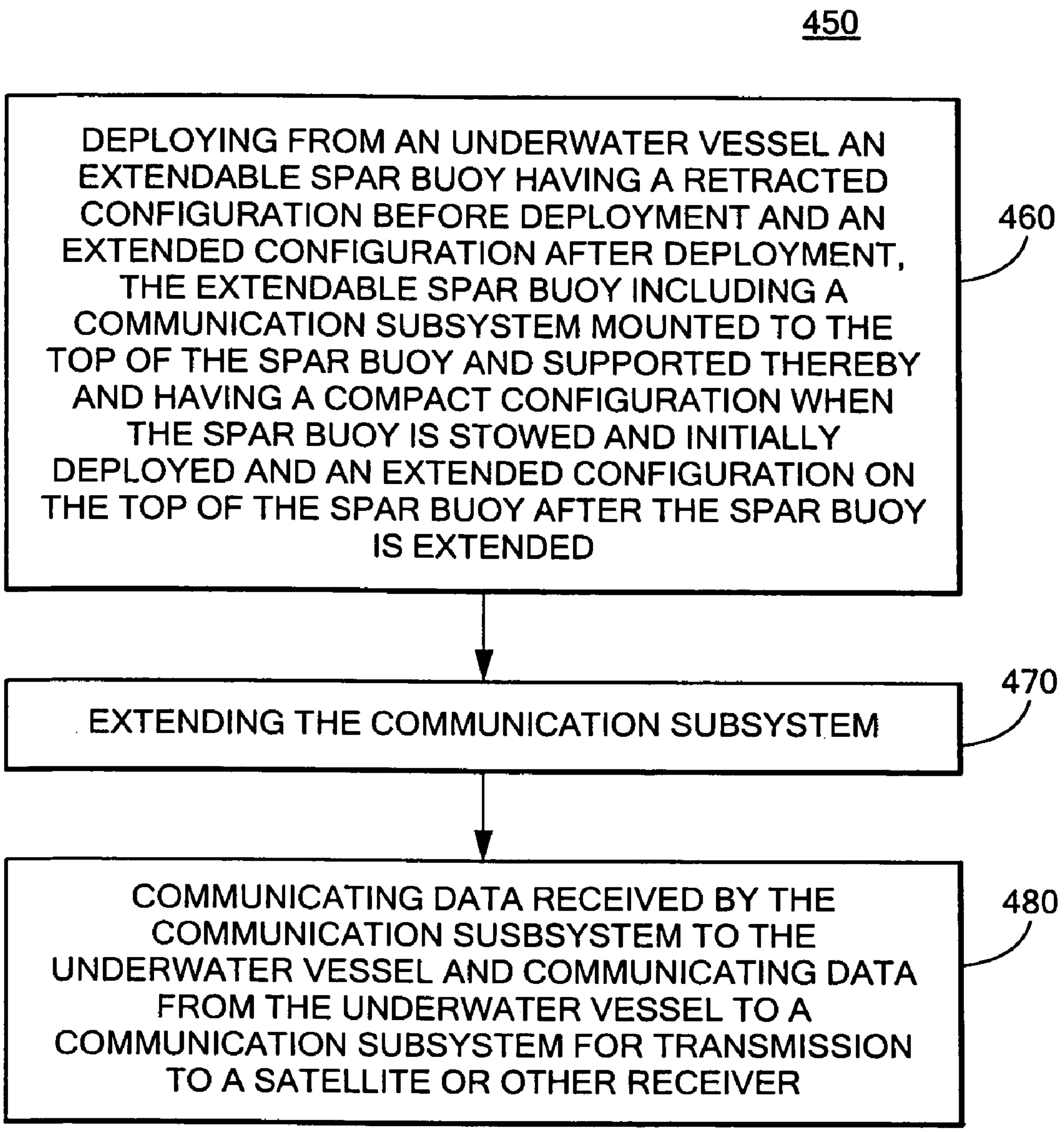
FIG. 9 is a flow chart depicting the primary steps associated with one method of establishing sea-based communication with an underwater vessel, for example a submarine, in accordance with the present invention.

Methods for establishing sea-based communications to and from an underwater vessel that include the extendable spar buoy sea-based communication system are described herein. One method 450, FIG. 9 for establishing satellite communication to and from an underwater vessel includes deploying from the underwater vessel an extendable spar buoy having a retracted configuration before deployment and an extended configuration after deployment, the extendable spar buoy including a communication subsystem mounted to the top of the spar buoy and supported thereby and having a compact configuration when the spar buoy is stowed and initially deployed, and an extended configuration on the top of the spar buoy after the spar buoy is extended, step 460; extending the communication subsystem, step 470; and communicating data received by the communication subsystem to the underwater vessel, and communicating data from the underwater vessel to a communication subsystem for transmission to a satellite or other receiver, step 480.

Figure 10:
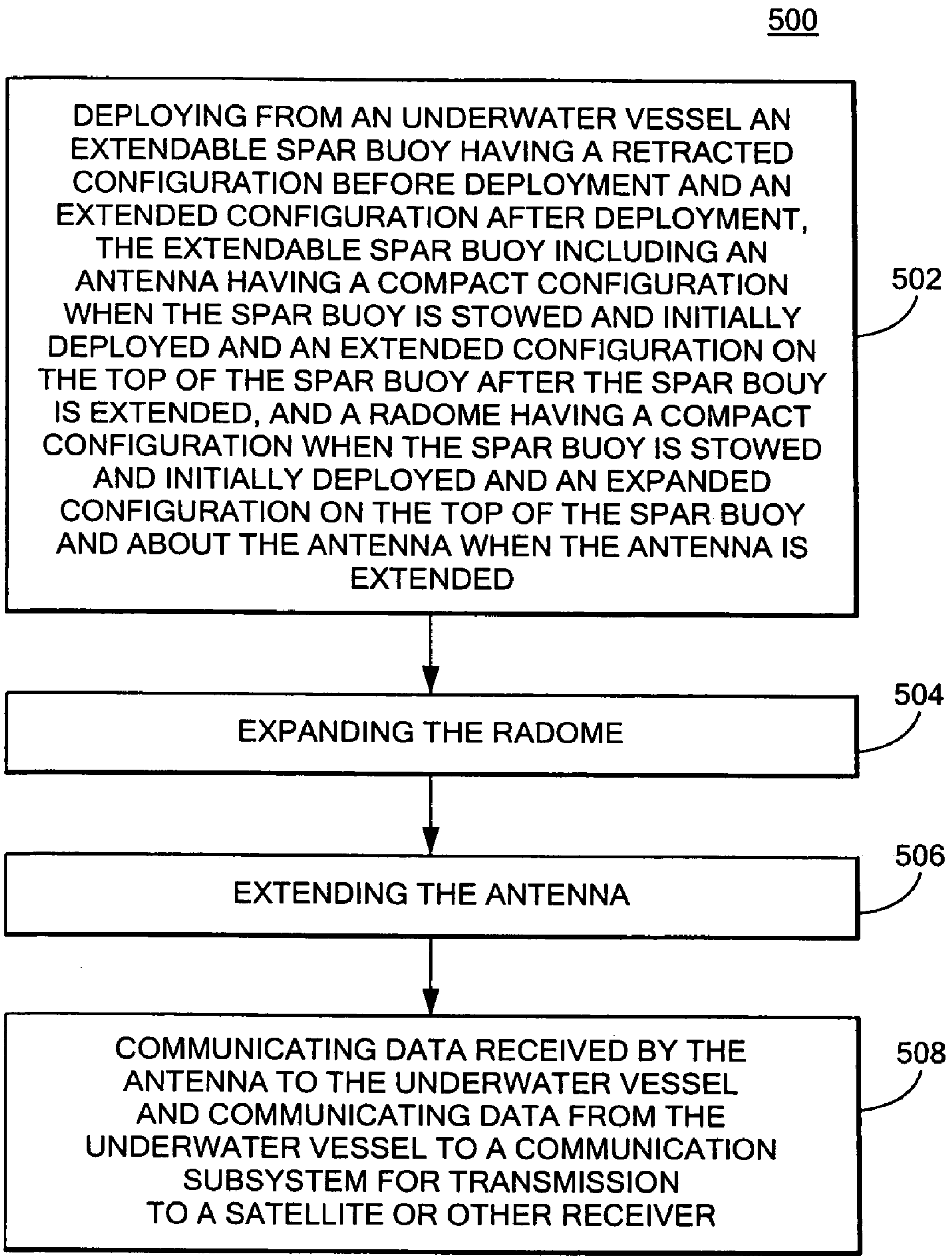
FIG. 10 is a flow chart depicting the primary steps associated with another method of establishing sea-based communication with an underwater vessel, for example a submarine, in accordance with the present invention.

Another method 500, FIG. 10, for establishing sea-based communication to and from and underwater vessel includes deploying from the underwater vessel an extendable spar buoy having a retracted configuration before deployment and an extended configuration after deployment, the extendable spar buoy including an antenna having a compact configuration when the spar buoy is stowed and initially deployed and an extended configuration on the top of the spar buoy after the spar buoy is extended, and a radome also having a compact configuration when the spar buoy is stowed and initially deployed and an expanded configuration on the top of the spar buoy and about the antenna when the antenna is extended, step 502; expanding the radome, step 504, extending the antenna, step 506; and communicating data received by the antenna to the underwater vessel, and communicating data from the underwater vessel to a communication subsystem for transmission to a satellite or other receiver, step 508.

Figure 11:
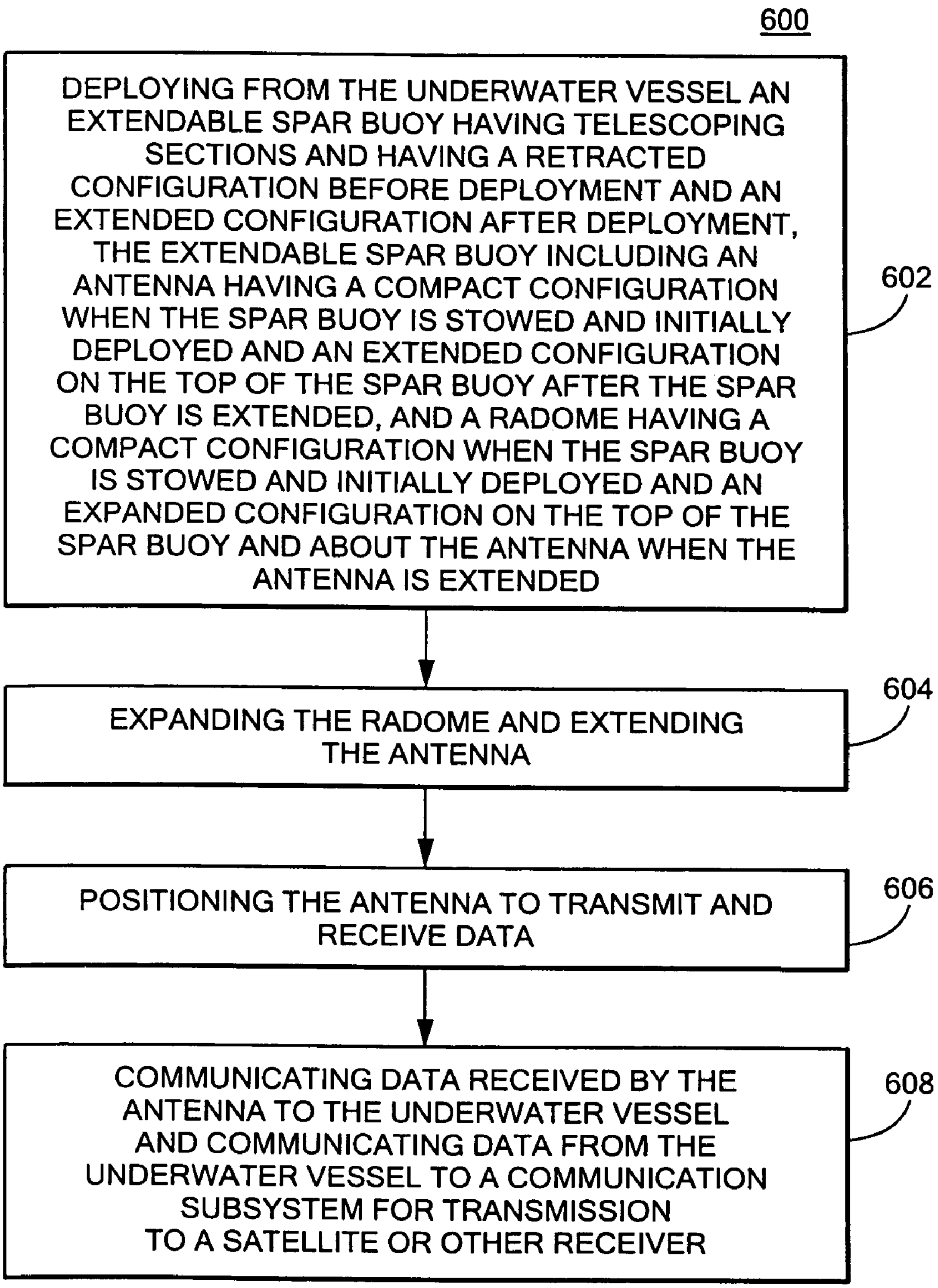
FIG. 11 is a flow chart depicting the primary steps associated with a further method of establishing sea-based communication with an underwater vessel, for example a submarine, in accordance with the present invention.

This invention further features a method 600, FIG. 11 for establishing sea-based communication to and from an underwater vessel that includes the following steps: deploying from the underwater vessel an extendable spar buoy including telescoping sections and having a retracted configuration before deployment and an extended configuration after deployment, the extendable spar buoy including an antenna having a compact configuration when the spar buoy is stowed and initially deployed and an extended configuration on the top of the spar buoy after the spar buoy is extended, and a radome also having a compact configuration when the spar buoy is stowed and initially deployed and an expanded configuration on the top of the spar buoy and about the antenna when the antenna is extended, step 602. The method further includes expanding the radome and extending the antenna, step 604, positioning the antenna to transmit and receive data, step 606, and communicating the data received by the antenna to the underwater vessel, and communicating data from the underwater vessel to a communication subsystem for transmission to a satellite or other receiver, step 608.

The present invention of an extendable spar buoy sea-based communication system comprises an efficiently packaged extendable spar buoy serving as a stable platform in open sea conditions, decoupling an attached or integrated sensor, such as an antenna system, from wind and wave conditions for effective sea-based communications. A communication link may also allow the spar buoy to be used from the underwater vessel at some distance, thus allowing the underwater vessel to maintain stealth and speed. The present invention is compatible with existing stowage and launching mechanisms. Also, the present invention may be used to support sea-based communications such as reception of SATCOM or Line-of-Sight (LOS) links as well as asymmetric bi-directional communications (transmit as well receive) which typically use selected Low Probability of Intercept (LPI) links to support transmission, for example, as well as other uses as described herein.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An extendable spar buoy sea-based communication system comprising:

a spar buoy including telescoping sections and having a retracted configuration deployable from an underwater vessel and an extended configuration after deployment; and a communication subsystem mounted to the top of the spar buoy and supported thereby.

2. The communication system of claim 1 in which the telescoping sections include at least first, second and third concentric sections.

3. The communication system of claim 2 in which the spar buoy in the extended configuration includes the first section extending as much as fifteen feet or more above water.

4. The communication system of claim 2 in which the second section includes a foam flotation portion.

5. The communication system of claim 2 in which the third section includes an air source, a battery pack, and a cable pack.

6. The communication system of claim 1 in which the spar buoy includes an aluminum outer skin.

7. The communication system of claim 1 in which the spar buoy in the retracted configuration is less than 15 feet long and less than 2 feet in diameter.

8. The communication system of claim 7 in which the spar buoy in the extended configuration is greater than 40 feet long.

9. The communication system of claim 1 in which the spar buoy in the retracted configuration is 10 feet long and 20 inches in diameter.

10. The communication system of claim 9 in which the spar buoy in the extended configuration is 60 feet long.

11. The communication system of claim 1 in which the spar buoy in the retracted configuration fits within submarine torpedo or missile launch tubes.

12. The communication system of claim 1 in which the communication subsystem has a compact configuration when the spar buoy is stowed and initially deployed and an extended configuration on top of the spar buoy after the spar buoy is extended.

13. The communication system of claim 1 in which the communication subsystem includes a sensor having a compact configuration when the spar buoy is stowed and initially deployed and an extended configuration on the top of the spar buoy after the spar buoy is extended.

14. The communication system of claim 13 in which the spar buoy in the retracted configuration includes the sensor in the compact configuration.

15. The communication system of claim 14 in which the sensor is an antenna configured to receive and/or transmit data.

16. The communication system of claim 15 in which the communication subsystem includes a radome having a compact configuration when the spar buoy is stowed and initially deployed and an expanded configuration on the top of the spar buoy and about the antenna when the antenna is extended.

17. The communication system of claim 16 in which the spar buoy in the retracted configuration includes the radome in the compact configuration.

18. The communication system of claim 17 in which the radome is a reduced Radar Cross Section (RCS) radome.

19. The communication system of claim 17 further including an antenna positioning subsystem for positioning the antenna.

20. The communication system of claim 19 in which the antenna positioning subsystem includes a deployment control subsystem.

21. The communication system of claim 20 in which the antenna positioning subsystem includes a pedestal positioning subsystem for positioning and pointing the antenna.

22. The communication system of claim 21 further including a down-converter and a low noise block (LNB) preamplifier for down-converting satellite signals to intermediate frequency (IF) signals.

23. The communication system of claim 22 further including an upconverter and a transmit amplifier for providing transmission capability of frequencies up to 45 GHZ.

24. The communication system of claim 23 further including an electronic subsystem for detecting the position of the antenna.

25. The communication system of claim 24 further including a tracking antenna control subsystem for tracking a satellite.

26. The communication system of claim 1 further including a communication link between the spar buoy and the underwater vessel.

27. The communication system of claim 26 in which the communication link includes optical fiber.

28. The communication system of claim 27 in which the optical fiber is a fiber optic microcable.

29. The communication system of claim 27 in which the optical fiber is a low-cost buffered fiber.

30. The communication system of claim 27 further including a spool of optical fiber on the spar buoy.

31. The communication system of claim 27 further including a spool of optical fiber on the underwater vessel.

32. The communication system of claim 27 further including a spool of optical fiber on the spar buoy and a spool of optical fiber on the underwater vessel.

33. The communication system of claim 1 in which the underwater vessel is a submarine.

34. An extendable spar buoy sea-based communication system comprising:

a spar buoy having a retracted configuration deployable from a firing tube in an underwater vessel, and an extended configuration including a lengthy section above water after deployment;

an antenna having a compact configuration when the spar buoy is stowed and initially deployed and an extended configuration on the top of the spar buoy after the spar buoy is extended; and a radome having a compact configuration when the spar buoy is stowed and initially deployed and an expanded configuration on the top of the spar buoy and about the antenna when the antenna is extended.

35. An extendable spar buoy sea-based communication system comprising:

a spar buoy including concentric telescoping sections and having a retracted configuration deployable from an underwater vessel and an extended configuration after deployment;

an antenna having a compact configuration when the spar buoy is stowed and initially deployed and an extended configuration on the top of the spar buoy after the spar buoy is extended;

a radome having a compact configuration when the spar buoy is stowed and initially deployed and an expanded configuration on the top of the spar buoy and about the antenna when the antenna is extended;

a communication link between the spar buoy and the underwater vessel; and an antenna positioning subsystem for positioning the antenna.

36. An extendable spar buoy sea-based communication system comprising:

a spar buoy including telescoping sections and having a retracted configuration deployable from an underwater vessel and an extended configuration after deployment;

an antenna having a compact configuration when the spar buoy is stowed and initially deployed and an extended configuration on the top of the spar buoy after the spar buoy is extended;

a radome having a compact configuration when the spar buoy is stowed and initially deployed and an expanded configuration on the top of the spar buoy and about the antenna when the antenna is extended; and an optical fiber communication link between the spar buoy and the underwater vessel.

37. An extendable spar buoy sea-based communication system comprising:

a spar buoy including telescoping sections and having a retracted configuration deployable from an underwater vessel and an extended configuration after deployment;

a communication subsystem mounted to the top of the spar buoy and supported thereby; and an optical fiber communication link between the spar buoy and the underwater vessel.

38. A method for establishing sea-based communication to and from an underwater vessel comprising:

deploying from the underwater vessel an extendable spar buoy including telescoping sections and having a retracted configuration before deployment and an extended configuration after deployment, the spar buoy including a communication subsystem mounted to the top of the spar buoy and supported thereby and having a compact configuration when the spar buoy is stowed and initially deployed and an extended configuration on the top of the spar buoy after the spar buoy is extended;

extending the communication subsystem; and communicating data received by the communication subsystem to the underwater vessel and communicating data from the underwater vessel to a communication subsystem for transmission to a satellite or other receiver.

39. A method for establishing sea-based communication to and from an underwater vessel comprising:

deploying from the underwater vessel an extendable spar buoy having a retracted configuration before deployment and an extended configuration after deployment, the spar buoy including an antenna having a compact configuration when the spar buoy is stowed and initially deployed and an extended configuration on the top of the spar buoy after the spar buoy is extended, and a radome having a compact configuration when the spar buoy is stowed and initially deployed and an expanded configuration on the top of the spar buoy and about the antenna when the antenna is extended;

expanding the radome;

extending the antenna; and communicating data received by the antenna to the underwater vessel and communicating data from the underwater vessel to a communication subsystem for transmission to a satellite or other receiver.

40. The method of claim 39 in which the extendable spar buoy includes telescoping sections.

41. The method of claim 40 in which the telescoping sections include at least first, second and third concentric sections.

42. The method of claim 41 further including extending at least fifteen feet above water said first section of said extendable spar buoy in the extended configuration.

43. The method of claim 41 further including disposing a foam flotation portion in said second section.

44. The method of claim 41 further including disposing an air source, a battery pack, and a cable pack in said third section.

45. The method of claim 39 in which the extendable spar buoy includes an aluminum outer skin.

46. The method of claim 39 in which the extendable spar buoy in the retracted configuration includes the antenna in the compact configuration.

47. The method of claim 46 in which the extendable spar buoy in the retracted configuration includes the radome in the compact configuration.

48. The method of claim 47 in which the radome is a reduced Radar Cross-Section (RCS) radome.

49. The method of claim 39 in which the retracted configuration of the extendable spar buoy is less than 15 feet long and less than 2 feet in diameter.

50. The method of claim 49 in which the extended configuration of the extendable spar buoy is greater than 40 feet long.

51. The method of claim 39 in which the retracted configuration of the extendable spar buoy is 10 feet long and 20 inches in diameter.

52. The method of claim 51 in which the extended configuration of the extendable spar buoy is 60 feet long.

53. The method of claim 39 further including positioning the antenna.

54. The method of claim 53 further including detecting the position of the antenna.

55. The method of claim 54 further including tracking a satellite.

56. The method of claim 39 in which communicating data includes communicating data via an optical fiber.

57. The method of claim 56 further including disposing said optical fiber about a spool on the spar buoy.

58. The method of claim 56 further including disposing said optical fiber about a spool on the underwater vessel.

59. The method of claim 56 further including disposing said optical fiber about a spool on the spar buoy and about a spool on the underwater vessel.

60. A method for establishing sea-based communication to and from an underwater vessel comprising:

deploying from the underwater vessel an extendable spar buoy having telescoping sections and having a retracted configuration before deployment and an extended configuration after deployment, the spar buoy including an antenna having a compact configuration when the spar buoy is stowed and initially deployed and an extended configuration on the top of the spar buoy after the spar buoy is extended, and a radome also having a compact configuration when the spar buoy is stowed and initially deployed and an expanded configuration on the top of the spar buoy and about the antenna when the antenna is extended;

expanding the radome and extending the antenna;

positioning the antenna to transmit and receive data; and communicating the data received by the antenna to the underwater vessel and communicating data from the underwater vessel to a communication subsystem for transmission to a satellite or other receiver.

61. An extendable spar buoy sea-based communication system comprising:

a spar buoy having a retracted configuration deployable from an underwater vessel and an extended configuration after deployment; and a communication subsystem mounted to the top of the spar buoy and supported thereby, the communication subsystem including:

an antenna configured to receive and/or transmit data having a compact configuration when the spar buoy is stowed in the retracted configuration and initially deployed, and an extended configuration on the top of the spar buoy after the spar buoy is extended, and a radome having a compact configuration when the spar buoy is stowed and initially deployed, and an expanded configuration on the top of the spar buoy and about the antenna when the antenna is extended.

62. The communication system of claim 61 in which the spar buoy in the retracted configuration includes the radome in the compact configuration.

63. The communication system of claim 62 in which the radome is a reduced Radar Cross Section (RCS) radome.

64. The communication system of claim 62 further including an antenna positioning subsystem for positioning the antenna.

65. The communication system of claim 64 in which the antenna positioning subsystem includes a deployment control subsystem.

66. The communication system of claim 65 in which the antenna positioning subsystem includes a pedestal positioning subsystem for positioning and pointing the antenna.

67. The communication system of claim 66 further including a down-converter and a low noise block (LNB) preamplifier for down-converting satellite signals to intermediate frequency (IF) signals.

68. The communication system of claim 67 further including an upconverter and a transmit amplifier for providing transmission capability of frequencies up to 45 GHZ.

69. The communication system of claim 68 further including an electronic subsystem for detecting the position of the antenna.

70. The communication system of claim 69 further including a tracking antenna control subsystem for tracking a satellite.

* * * * *